United States Patent
Sakurai et al.

(10) Patent No.: US 8,846,210 B2
(45) Date of Patent: Sep. 30, 2014

(54) CERAMIC ELECTRONIC COMPONENT AND METHOD OF MANUFACTURING CERAMIC ELECTRONIC COMPONENT

(75) Inventors: Toshio Sakurai, Tokyo (JP); Hisashi Kobuke, Tokyo (JP); Tomohiro Arashi, Tokyo (JP); Kiyoshi Hatanaka, Tokyo (JP); Yasuharu Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 342 days.

(21) Appl. No.: 13/021,342

(22) Filed: Feb. 4, 2011

(65) Prior Publication Data

US 2011/0223431 A1    Sep. 15, 2011

(30) Foreign Application Priority Data

Mar. 9, 2010 (JP) .................................. 2010-051573
Nov. 30, 2010 (JP) .................................. 2010-267646

(51) Int. Cl.
| | |
|---|---|
| *B32B 18/00* | (2006.01) |
| *B32B 38/00* | (2006.01) |
| *B32B 37/06* | (2006.01) |
| *C04B 35/626* | (2006.01) |
| *C04B 35/462* | (2006.01) |
| *C04B 35/20* | (2006.01) |
| *H01G 4/12* | (2006.01) |
| *H01G 4/20* | (2006.01) |
| *H01G 4/30* | (2006.01) |

(52) U.S. Cl.
CPC .......... *H01G 4/1227* (2013.01); *C04B 35/6263* (2013.01); *C04B 2235/36* (2013.01); *C04B 2237/341* (2013.01); *C04B 2235/3262* (2013.01); *C04B 2237/60* (2013.01); *B32B 18/00* (2013.01); *C04B 2235/6025* (2013.01); *C04B 2235/3281* (2013.01); *C04B 2235/3234* (2013.01); *C04B 2235/3409* (2013.01); *C04B 35/462* (2013.01); *C04B 2235/407* (2013.01); *C04B 35/62685* (2013.01); *C04B 2235/3445* (2013.01); *C04B 2235/3208* (2013.01); *C04B 2237/346* (2013.01); *C04B 2235/3275* (2013.01); *C04B 2235/408* (2013.01); *C04B 35/20* (2013.01); *C04B 2235/3298* (2013.01); *C04B 35/62675* (2013.01); *H01G 4/20* (2013.01); *C04B 2235/3284* (2013.01); *C04B 2235/3224* (2013.01); *C04B 2237/58* (2013.01); *C04B 2235/3215* (2013.01); *H01G 4/30* (2013.01)

USPC .......... 428/660; 428/701; 428/702; 428/649; 428/446; 156/89.12; 333/185; 501/139

(58) Field of Classification Search
None
See application file for complete search history.

(56) References Cited

U.S. PATENT DOCUMENTS

| 5,041,342 A | 8/1991 | Umeda et al. |
| 6,376,085 B1 | 4/2002 | Oobuchi et al. |

(Continued)

FOREIGN PATENT DOCUMENTS

| CN | 101844428 A | 9/2010 |
| EP | 2 234 128 A1 | 9/2010 |

(Continued)

OTHER PUBLICATIONS

English-language Translation of May 6, 2013 Chinese Office Action issued in Application No. 201110056287.6.

(Continued)

*Primary Examiner* — Vera Katz
(74) *Attorney, Agent, or Firm* — Oliff PLC (57) ABSTRACT

A ceramic electronic component includes a first dielectric layer, a second dielectric layer, and a boundary reaction layer. The first dielectric layer is a layer containing BaO, $Nd_2O_3$, and $TiO_2$, the second dielectric layer is a layer containing a material different from the material of the first dielectric layer, and the boundary reaction layer is a layer formed between the first dielectric layer and the second dielectric layer and containing at least one of Zn, Ti, Cu, and Mg.

6 Claims, 4 Drawing Sheets

(56) References Cited

U.S. PATENT DOCUMENTS

| | | |
|---|---|---|
| 8,508,914 B2 * | 8/2013 | Sakurai et al. ............. 361/321.1 |
| 2002/0064669 A1 | 5/2002 | Oobuchi et al. |
| 2003/0034554 A1 * | 2/2003 | Onitani et al. ................ 257/705 |
| 2010/0244987 A1 | 9/2010 | Sakurai et al. |

FOREIGN PATENT DOCUMENTS

| | | |
|---|---|---|
| JP | A-61-212101 | 9/1986 |
| JP | A-02-086188 | 3/1990 |
| JP | A-11-243034 | 9/1999 |
| JP | A-2001-284807 | 10/2001 |
| JP | 2005039263 A * | 10/2005 |

OTHER PUBLICATIONS

Search Report issued in European Application No. 11155125.5 dated Jul. 22, 2011.

* cited by examiner

CERAMIC ELECTRONIC COMPONENT AND METHOD OF MANUFACTURING CERAMIC ELECTRONIC COMPONENT

CROSS-REFERENCE TO RELATED APPLICATIONS

This application is based upon and claims the benefit of priority from Japanese Patent Application No. 2010-051573, filed Mar. 9, 2010; and Japanese Patent Application No. 2010-267646, filed Nov. 30, 2010, the entire contents of which are incorporated herein by reference.

BACKGROUND OF THE INVENTION

1. Field of the Invention

The present invention relates to a ceramic electronic component and a method of manufacturing a ceramic electronic component.

2. Description of the Related Art

In recent years, with developments in miniaturization and higher performance of products in fields such as mobile communication devices including mobile phones, AV devices, and computer devices, miniaturization and higher performance of various electronic components used in these devices are also demanded. To address miniaturization and higher performance of such various electronic components, surface mount devices (SMDs) having a conductor (hereinafter, referred to as an "internal conductor") such as an electrode and wire in the substrate are now mainstream as electronic devices.

An SMD has a printed board on which each component such as an IC chip and other chip components is mounted. As an electronic device mounted on the SMD, a laminated ceramic electronic component obtained by simultaneously calcining a plurality of kinds of ceramic compositions having different material characteristics is used. The laminated ceramic electronic component includes, for example, an LC filter made up of a combination of magnetic material and dielectric material and a circuit substrate (element) containing a capacitor made up of a combination of high dielectric constant material and low dielectric constant material.

With an LC filter, a combination of an inductor portion made of a ceramic material having a low dielectric constant and a high Q factor in order to provide a high self-resonant frequency and a capacitor portion made of a material having excellent temperature characteristics and a high dielectric constant results in an LC element having a high Q factor and excellent temperature characteristics. With a capacitor contained in the circuit substrate, a combination of a high dielectric constant material and a low dielectric constant material results in a reduced distributed capacitance compared with a capacitor made of only a high dielectric constant material and an increased capacity compared with a capacitor made of only a low dielectric constant material.

A known laminated ceramic electronic component is provided as, for example, a circuit substrate created by simultaneously calcining and integrating an insulating layer having a high relative dielectric constant in a microwave band and also a high Q factor and an insulating layer having a low relative dielectric constant (see Japanese Laid-open Patent Publication No. 2001-284807, for example). Another known laminated ceramic electronic component is provided as a dielectric resonator created by arranging and integrally calcining layer materials with different dielectric constants (see Japanese Laid-open Patent Publication No. 61-212101 and Japanese Laid-open Patent Publication No. 02-086188, for example). A still another known laminated ceramic electronic component is provided as a green sheet laminated body in which a glass ceramic layer of third glass ceramic whose composition ratio is intermediate between those of a first green sheet and a second green sheet is placed therebetween (see Japanese Patent No. 2739767, for example).

However, in an electronic device formed by simultaneously calcining different materials to laminate a plurality of dielectric layers, there is a problem that adhesion between dielectric layers may be insufficient, thereby making dielectric layers more likely to peel. Thus, in an electronic device including a ceramic electronic component created by laminating a plurality of dielectric layers, development of ceramic electronic components that are not subject to limitations of materials of dielectric layers to be combined is desired.

SUMMARY OF THE INVENTION

A ceramic electronic component according to an aspect of the present invention includes a first dielectric layer containing $BaO$, $Nd_2O_3$, and $TiO_2$; a second dielectric layer containing a material different from the first dielectric layer; and a boundary reaction layer formed between the first dielectric layer and the second dielectric layer and containing at least one of Zn, Ti, Cu, and Mg.

A method of manufacturing a ceramic electronic component according to another aspect of the present invention includes mixing a first base material containing Ba, Nd, and Ti and a first additive containing at least ZnO to a first mixture; calcining the first mixture in oxygen atmosphere at a temperature of 800° C. or more and 950° C. or less to produce a first finished material; mixing a second base material containing a material different from the first base material and a second additive containing at least ZnO to produce a second mixture; calcining the second mixture in oxygen atmosphere at a temperature of 800° C. or more and 950° C. or less to produce a second finished material; alternately laminating a first sheet body and a second sheet body to form a sheet laminated body, the first sheet body being obtained by forming a first slurry containing the first finished material in a sheet shape, and the second sheet body being obtained by forming a second slurry containing the second finished material in a sheet shape; and calcining the sheet laminated body to produce a laminated sintered body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention will be described in detail below with reference to drawings. However, the present invention is not limited by the following mode (hereinafter, referred to as an embodiment) to carry out the present invention. Elements in the following embodiment include those elements easily conceived by a person skilled in the art and substantially identical elements, so-called equivalents. Further, elements disclosed by the following embodiment can be combined when appropriate.

Embodiment

Figure 1:
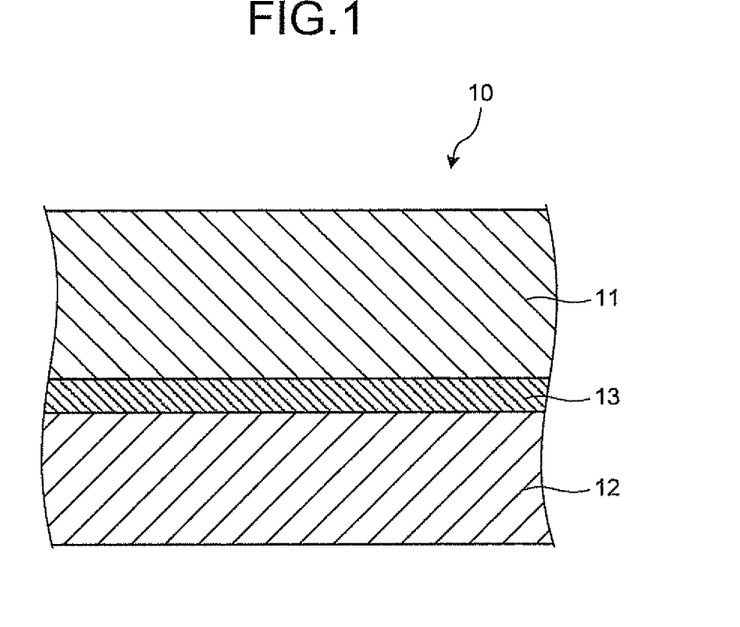
FIG. 1 is a simplified sectional view showing the configuration of a ceramic electronic component according to an exemplary embodiment of the present invention.

An embodiment of a ceramic electronic component of the present invention will be described below with reference to drawings. FIG. 1 is a simplified sectional view showing the configuration of the ceramic electronic component according to the exemplary embodiment of the present invention. As shown in FIG. 1, a ceramic electronic component 10 in the present embodiment includes a first dielectric layer 11, a second dielectric layer 12, and a boundary reaction layer 13. The first dielectric layer 11 is a layer containing BaO, $Nd_2O_3$, and $TiO_2$, the second dielectric layer 12 is a layer containing a material different from that of the first dielectric layer 11, and the boundary reaction layer 13 is a layer formed between the first dielectric layer 11 and the second dielectric layer 12 and containing at least one of Zn, Ti, Cu, and Mg.

First Dielectric Layer

The first dielectric layer 11 is configured by a layer whose main component contains BaO, $Nd_2O_3$, and $TiO_2$.

Main Component

The main component of the first dielectric layer 11 contains at least BaO, $Nd_2O_3$, and $TiO_2$. The main component is, for example, BaO—$Nd_2O_3$—$TiO_2$ based or $Bi_2O_3$—BaO—$Nd_2O_3$—$TiO_2$ based dielectric ceramic. Contents of BaO, $Nd_2O_3$, and $TiO_2$ are not specifically limited and may be adjusted when necessary.

For a BaO—$Nd_2O_3$—$TiO_2$ based compound, a compound represented by a composition formula in the following formula (1) and satisfying relations represented by the following relation (2) to relation (5) is preferable, where x, y, and z in the following formula (1) and relations (2) to (5) are in mole percent.

$$xBaO \cdot yNd_2O_3 \cdot zTiO_2 \quad (1)$$

$$6.0 \leq x \leq 23.0 \quad (2)$$

$$13.0 \leq y \leq 30.0 \quad (3)$$

$$64.0 \leq z \leq 68.0 \quad (4)$$

$$x+y+z=100 \quad (5)$$

The first dielectric layer 11 may further contain another material than BaO, $Nd_2O_3$, and $TiO_2$ as a main component. The other main component is, for example, forsterite (the chemical formula thereof is generally represented by $2MgO \cdot SiO_2$ or $Mg_2SiO_4$ and the former is used in this specification), enstatite ($MgO \cdot SiO_2$), and diopside ($CaO \cdot MgO \cdot 2SiO_2$). Among these main components, $2MgO \cdot SiO_2$ is particularly preferable. In terms of making a dielectric loss smaller, $2MgO \cdot SiO_2$ is preferably contained in the first dielectric layer 11 in the form of forsterite crystal. Whether a forsterite crystal is contained in the first dielectric layer 11 can be checked by X-ray diffraction spectroscopy (XRD).

A BaO—$Nd_2O_3$—$TiO_2$ based compound has a high relative dielectric constant $\in r$ and the value of the relative dielectric constant $\in r$ ranges from 55 to 105. $2MgO \cdot SiO_2$ has a low relative dielectric constant $\in r$ as a simple substance and the value of the relative dielectric constant $\in r$ is about 6.8. The first dielectric layer 11 lowers the relative dielectric constant $\in r$ thereof by containing a BaO—$Nd_2O_3$—$TiO_2$ based compound with a high relative dielectric constant $\in r$ and $2MgO \cdot SiO_2$ with a low relative dielectric constant $\in r$ as main components.

The Q·f factor of a BaO—$Nd_2O_3$—$TiO_2$ based compound is 2000 GHz or more and 8000 GHz or less. On the other hand, the Q·f factor of $2MgO \cdot SiO_2$ is about 200000 GHz and the dielectric loss of $2MgO \cdot SiO_2$ is smaller when compared with that of the BaO—$Nd_2O_3$—$TiO_2$ based compound. In the present embodiment, the dielectric layer with a small dielectric loss can be formed by including a BaO—$Nd_2O_3$—$TiO_2$ based compound and $2MgO \cdot SiO_2$ as main components of the first dielectric layer 11.

The Q·f factor which represents the magnitude of the dielectric loss is a product of the phase difference between the actual current and voltage, a Q factor: an inverse of the tangent tan δ of a loss angle δ, which is a difference from 90 degrees of the ideal current and voltage (Q=1/tan δ), and a resonance frequency f.

When an alternating current is applied to an ideal dielectric ceramic, the current and the voltage normally has a phase difference of 90 degrees. However, if the frequency of the AC current increases to reach a high frequency, the electric polarization of the dielectric ceramic or the orientation of polar molecules cannot follow changes in electric field of the high frequency or the electric flux density has a delay in phase (phase difference) with respect to the electric field due to conduction of electron or ion so that the actual current and voltage have a phase difference other than 90 degrees. A phenomenon in which a portion of energy of the high frequency is converted into heat and dissipated due to such a phase difference is called an inductive dielectric loss. The magnitude of the dielectric loss is represented by the Q·f factor. The Q·f factor increases with a decreasing dielectric loss and decreases with an increasing dielectric loss.

Sub-Component

The first dielectric layer 11 may further contain sub-components thereof. Sub-components contained in the first dielectric layer 11 include, for example, zinc oxide (ZnO), boron oxide ($B_2O_3$), bismuth oxide ($Bi_2O_3$), cobalt oxide (CoO), manganese oxide (MnO), copper oxide (CuO), alkali-earth metal oxide, glass, and titanium oxide ($TiO_2$), but are not limited to these. If alkali-earth metal oxide is used as a sub-component, the alkali-earth metal oxide is preferably calcium oxide ($CaCO_3$). The glass is preferably glass containing lithium oxide ($Li_2O$).

With each of the above sub-components being contained in the first dielectric layer 11, the sintering temperature of the first dielectric layer 11 can be lowered. A conductive material composed of an Ag based metal or the like is used as an internal conductor of the ceramic electronic component 10. By lowering the sintering temperature of the first dielectric layer 11 to below the melting point of the conductive material by including each sub-component in the first dielectric layer 11, the first dielectric layer 11 can be calcined at a lower temperature.

Though the content of sub-components is not specifically limited, it is preferable that the quantity of the sum of all sub-components with respect to the sum of all main components be 1.0% or more and 20.0% or less by mass.

If zinc oxide is contained as a sub-component, the content of zinc oxide is, as the mass ratio of ZnO when the mass of zinc oxide is converted as ZnO, preferably 0.1% or more and 7.0% or less by mass with respect to the main component of 100% by mass, and particularly preferably 1.5% or more and 7.0% or less by mass.

If boron oxide is contained as a sub-component, the content of boron oxide is, as the mass ratio of $B_2O_3$ when the mass of boron oxide is converted as $B_2O_3$, preferably 0.1% or more and 3.0% or less by mass with respect to the main component of 100% by mass, and particularly preferably 1.0% or more and 2.5% or less by mass.

If bismuth oxide is contained as a sub-component, the content of bismuth oxide is, as the mass ratio of $Bi_2O_3$ when the mass of bismuth oxide is converted as $Bi_2O_3$, preferably 1.0% or more and 4.0% or less by mass with respect to the main component of 100% by mass, and particularly preferably 1.5% or more and 3.5% or less by mass.

If cobalt oxide is contained as a sub-component, the content of cobalt oxide is, as the mass ratio of CoO when the mass of cobalt oxide is converted as CoO, preferably 0.5% or more and 2.0% or less by mass with respect to the main component of 100% by mass, and particularly preferably 1.0% or more and 1.5% or less by mass.

If manganese oxide is contained as a sub-component, the content of manganese oxide is, as the mass ratio of MnO when the mass of manganese oxide is converted as MnO, preferably 0.3% or more and 1.5% or less by mass with respect to the main component of 100% by mass, and particularly preferably 0.5% or more and 1.0% or less by mass.

If copper oxide is contained as a sub-component, the content of copper oxide is, as the mass ratio of CuO when the mass of copper oxide is converted as CuO, preferably 0.1% or more and 2.0% or less by mass with respect to the main component of 100% by mass, and particularly preferably 0.7% or more and 1.3% or less by mass.

If calcium oxide, which is an alkali-earth metal oxide, is contained as a sub-component, the content of calcium oxide is, as the mass ratio of $CaCO_3$ when the mass of calcium oxide is converted as $CaCO_3$, preferably 0.1% or more and 1.5% or less by mass with respect to the main component of 100% by mass, and particularly preferably 0.5% or more and 1.5% or less by mass.

If glass is contained as a sub-component, the content of glass is preferably 2.0% or more and 7.0% or less by mass with respect to the main component of 100% by mass, and particularly preferably 4.0% or more and 5.5% or less by mass.

Second Dielectric Layer

The second dielectric layer 12 is a dielectric layer containing a material that is different from that of the first dielectric layer 11. Like the first dielectric layer 11, the second dielectric layer 12 includes the main component and sub-component, but may be constituted exclusively of the main component. In the present embodiment, the second dielectric layer 12 includes the main component and sub-component. A dielectric layer containing a material that is different from that of the first dielectric layer 11 may be provided if components of the second dielectric layer 12 are not completely identical to those of the first dielectric layer 11. For example, a portion of components of the first dielectric layer 11 may be contained in the second dielectric layer 12.

Main Component

The main component of the second dielectric layer 12 only needs to be a different material from that of the first dielectric layer 11 and the type thereof is not specifically limited. A publicly known material may be used as the main component of the second dielectric layer 12. The main component contained in the second dielectric layer 12 includes, for example, forsterite ($2MgO.SiO_2$), enstatite ($MgO.SiO_2$), and diopside ($CaO.MgO.2SiO_2$). Among these components, a dielectric layer having forsterite as the main component is preferable in view of a low relative dielectric constant ∈r and a large Q·f factor.

Sub-Component

The same sub-component as that contained in the first dielectric layer 11 is used as a sub-component contained in the second dielectric layer 12. If the main component contained in the second dielectric layer 12 is only forsterite, the content of the sub-component increases when only forsterite is sintered at a low temperature. Thus, the content of the sub-component contained in the second dielectric layer 12 is, as the quantity of the sum of all sub-components with respect to the sum of all main components, preferably 16.1% or more and 48.0% or less by mass.

If zinc oxide is contained as a sub-component, the content of zinc oxide is, as the mass ratio of ZnO when the mass of zinc oxide is converted as ZnO, preferably 9.0% or more and 18.0% or less by mass with respect to the main component of 100% by mass, and particularly preferably 10.0% or more and 16.0% or less by mass.

If boron oxide is contained as a sub-component, the content of boron oxide is, as the mass ratio of $B_2O_3$ when the mass of boron oxide is converted as $B_2O_3$, preferably 4.0% or more and 10.0% or less by mass with respect to the main component of 100% by mass, and particularly preferably 4.0% or more and 10.0% or less by mass.

If copper oxide is contained as a sub-component, the content of copper oxide is, as the mass ratio of CuO when the mass of copper oxide is converted as CuO, preferably 1.0% or more and 8.0% or less by mass with respect to the main component of 100% by mass, and particularly preferably 2.0% or more and 6.0% or less by mass.

If calcium oxide, which is an alkali-earth metal oxide, is contained as a sub-component, the content of calcium oxide is, as the mass ratio of $CaCO_3$ when the mass of calcium oxide is converted as $CaCO_3$, preferably 0.1% or more and 6.0% or less by mass with respect to the main component of 100% by mass, and particularly preferably 0.1% or more and 4.0% or less by mass.

If glass is contained as a sub-component, the content of glass is preferably 2.0% or more and 6.0% or less by mass with respect to the main component of 100% by mass, and particularly preferably 4.0% or more and 6.0% or less by mass.

If titanium oxide is contained as a sub-component, the content of titanium oxide is, as the mass ratio of $TiO_2$ when the mass of titanium oxide is converted as $TiO_2$, preferably 0.5% or more and 5.0% or less by mass with respect to the main component of 100% by mass, and particularly preferably 1.0% or more and 2.0% or less by mass.

Sub-components are not limited to the above zinc oxide, boron oxide, copper oxide, alkali-earth metal oxide, glass, and titanium oxide and may contain at least one of $Bi_2O_3$, CoO, MoO and the like.

Boundary Reaction Layer

The boundary reaction layer 13 is a layer formed between the first dielectric layer 11 and the second dielectric layer 12 and containing at least one of Zn, Ti, Cu, and Mg. With the presence of the boundary reaction layer 13 between the first dielectric layer 11 and the second dielectric layer 12, the first dielectric layer 11 and the second dielectric layer 12 can be made to be laminated while holding strong adhesive strength via the boundary reaction layer 13. Thus, with the boundary reaction layer 13 being formed between the first dielectric layer 11 and the second dielectric layer 12, peeling of the laminated first dielectric layer 11 and second dielectric layer 12 can be suppressed.

When the first dielectric layer 11 and the second dielectric layer 12 are laminated and simultaneously calcined, each component contained in the first dielectric layer 11 or the second dielectric layer 12 is considered to move to the vicinity of the interface between the first dielectric layer 11 and the second dielectric layer 12 to form the boundary reaction layer 13. The boundary reaction layer 13 is formed by each component contained in the first dielectric layer 11 or the second dielectric layer 12 being calcined and thus, the boundary reaction layer 13 is formed between the first dielectric layer 11 and the second dielectric layer 12 with the fixed thickness. Moreover, the boundary reaction layer 13 is formed by components equivalent to those of the first dielectric layer 11 or the second dielectric layer 12 being included and sintered and thus, Zn, Ti, Cu, and Mg contained in the boundary reaction layer 13 as at least one component to form the boundary reaction layer 13 are considered to form respective oxides of Zn, Ti, Cu, and Mg. Since ZnO and $TiO_2$ are highly reactive, the formation of a $ZnTiO_3$ crystalline phase at a relatively low temperature is considered. With the presence of the $ZnTiO_3$ crystalline phase inside the boundary reaction layer 13, a contribution thereof to adhesion between the first dielectric layer 11 and the second dielectric layer 12 is considered. Therefore, the first dielectric layer 11 and the second dielectric layer 12 can be made to be laminated with stability while holding strong adhesive strength via the boundary reaction layer 13.

Zn, Ti, Cu, and Mg contained in the boundary reaction layer 13 are considered to form, as described above, respective oxides of Zn, Ti, Cu, and Mg. When a layer containing ZnO and $TiO_2$ is soaked in a plating solution to plate the surface of the layer containing ZnO and $TiO_2$, the plating solution can be inhibited from infiltrating into the layer of ZnO and $TiO_2$. The boundary reaction layer 13 is a layer containing ZnO and $TiO_2$ as components thereof and thus, when the surface of the ceramic electronic component 10 is plated, the plating solution will not infiltrate into the boundary reaction layer 13. With the formation of the boundary reaction layer 13 between the first dielectric layer 11 and the second dielectric layer 12, the plating solution can be prevented from infiltrating into the boundary reaction layer 13. Thus, the laminated first dielectric layer 11 and second dielectric layer 12 can be prevented from peeling while infiltration of the plating solution into the boundary reaction layer 13 is prevented.

The boundary reaction layer 13 is a layer containing Cu and/or Mg. The boundary reaction layer 13 is formed by the first dielectric layer 11 and the second dielectric layer 12 being laminated and sintered and thus, Cu and/or Mg contained as component(s) constituting the boundary reaction layer 13 are considered to be oxidized and contained as CuO and/or MgO respectively. Moreover, Cu and Mg are considered likely to form a compound with Ti. With CuO and/or MgO being contained in the boundary reaction layer 13 as component(s) constituting the boundary reaction layer 13 together with TiO, CuO and/or MgO are (is) considered to be present inside the boundary reaction layer 13 in a state in which CuO and/or MgO are (is) bound to $TiO_2$. Thus, with the boundary reaction layer 13 containing, in addition to Zn and Ti, Cu and/or Mg, the boundary reaction layer 13 can cause the first dielectric layer 11 and the second dielectric layer 12 to be laminated with stability by holding strong adhesive strength via the boundary reaction layer 13 while maintaining the fixed thickness of the boundary reaction layer 13.

Thus, even if the first dielectric layer 11 and the second dielectric layer 12 are layers of different materials and the first dielectric layer 11 and the second dielectric layer 12 are laminated and formed, with the presence of the boundary reaction layer 13 containing at least one of Zn, Ti, Cu, and Mg between the first dielectric layer 11 and the second dielectric layer 12, the first dielectric layer 11 and the second dielectric layer 12 can be made to be laminated with stability while holding strong adhesive strength via the boundary reaction layer 13. Therefore, with the boundary reaction layer 13 being formed between the first dielectric layer 11 and the second dielectric layer 12, peeling of the laminated first dielectric layer 11 and second dielectric layer 12 can be suppressed.

The form of Zn contained in the boundary reaction layer 13 is not specifically limited and includes such as an element, an oxide, and a zinc compound. The zinc compound includes zinc sulfate and zinc chloride. In terms of conductivity and life when used in the ceramic electronic component 10, it is desirable that the form of Zn contained in the boundary reaction layer 13 be ZnO.

The form of Ti contained in the boundary reaction layer 13 is not specifically limited and includes such as an element, a titanium oxide, and a titanium compound. The titanium compound includes such as titanium chloride. In terms of conductivity and life when used in the ceramic electronic component 10, it is desirable that the form of Ti contained in the boundary reaction layer 13 be $TiO_2$.

The form of Cu contained in the boundary reaction layer 13 is not specifically limited and includes such as an element, a copper oxide, and a copper compound. The copper compound includes such as copper sulfate and copper chloride. In terms of conductivity and life when used in the ceramic electronic component 10, it is desirable that the form of Cu contained in the boundary reaction layer 13 be CuO.

The form of Mg contained in the boundary reaction layer 13 is not specifically limited and includes such as an element, a magnesium oxide, and a compound. The compound includes such as magnesium sulfate and magnesium chloride. In terms of conductivity and life when used in the ceramic electronic component 10, it is desirable that the form of Mg contained in the boundary reaction layer 13 be MgO.

In the present embodiment, the compounding ratio of Ti, Zn, Cu, and Mg is not specifically limited and may be adjusted when necessary.

In the present embodiment, the boundary reaction layer 13 is assumed to be a layer containing Zn, Ti, Cu, or Mg, but the ceramic electronic component 10 in the present embodiment is not limited to this and the boundary reaction layer 13 needs only to be a layer containing at least one of Zn, Ti, Cu, or Mg. In terms of suppressing an occurrence of peeling of dielectric layers containing different materials like the first dielectric layer 11 and the second dielectric layer 12 more effectively, it is preferable that the boundary reaction layer 13 be a layer containing Zn and Ti and one of or both of Cu and Mg. Moreover, the boundary reaction layer 13 may contain, in addition to components of Zn, Ti, Cu, and Mg, CoO, $Fe_2O_3$, NiO and the like as components contained in the boundary reaction layer 13.

The thickness of the boundary reaction layer 13 may be a suitable thickness based on materials of the first dielectric layer 11 and the second dielectric layer 12 as appropriate and is not specifically limited. In terms of causing the first dielectric layer 11 and the second dielectric layer 12 to be laminated with stability while maintaining dielectric characteristics near boundary surface of the boundary reaction layer 13 with the first dielectric layer 11 and the second dielectric layer 12, the thickness of the boundary reaction layer 13 is preferably 1 μm or more and 10 μm or less. This is because if the thickness of the boundary reaction layer 13 falls below 1 μm, dielectric characteristics near boundary surfaces with the first dielectric layer 11 and the second dielectric layer 12 cannot be maintained. If the thickness of the boundary reaction layer 13 exceeds 10 μm, the first dielectric layer 11 and the second dielectric layer 12 cannot be made to be laminated with stability.

In the present embodiment, boundary surfaces of the boundary reaction layer 13 with the first dielectric layer 11 and the second dielectric layer 12 do not have to be definite and boundary surfaces of the boundary reaction layer 13 with the first dielectric layer 11 and the second dielectric layer 12 may be determined from the ratio of quantities of material components contained near boundary surfaces of the boundary reaction layer 13 with the first dielectric layer 11 and the second dielectric layer 12, a contrast observed during composition (COMPO) image observation using a scanning electron microscope (SEM) or the like.

A method of simultaneously calcining the first dielectric layer 11 and the second dielectric layer 12 to form the boundary reaction layer 13 is known as a formation method of the boundary reaction layer 13. The first dielectric layer 11 is constituted of a first base material used to configure the first dielectric layer 11 and a first additive and the second dielectric layer 12 is constituted of a second perform used to configure the second dielectric layer 12 and a second additive. These first base material, first additive, second base material, and second additive are simultaneously calcined to cause a reaction to form the first dielectric layer 11 and the second dielectric layer 12, materials that can constitute the boundary reaction layer 13 are moved to between the first dielectric layer 11 and the second dielectric layer 12, and thus, the boundary reaction layer 13 is formed between the first dielectric layer 11 and the second dielectric layer while the first dielectric layer 11, the second dielectric layer 12, and the boundary reaction layer 13 can be integrated.

The method of forming the boundary reaction layer 13 is not specifically limited to this and after materials that can constitute the first dielectric layer 11 and the boundary reaction layer 13 being laminated and calcined, the second dielectric layer 12 may be stacked on the formed boundary reaction layer 13. Or, after materials that can constitute the second dielectric layer 12 and the boundary reaction layer 13 being laminated and calcined, the first dielectric layer 11 may be stacked on the formed boundary reaction layer 13.

In the present embodiment, it is preferable that ZnO be contained in both the first dielectric layer 11 and the second dielectric layer 12. A layer containing ZnO and $TiO_2$ has the effect of inhibiting infiltration of a plating solution into the layer containing ZnO and $TiO_2$ when the layer is soaked in the plating solution. If ZnO is contained in both the first dielectric layer 11 and the second dielectric layer 12, the quantity of compounds generated by a reaction of ZnO and $TiO_2$ is considered to increase in the boundary reaction layer 13 between the first dielectric layer 11 and the second dielectric layer 12. Accordingly, the plating solution can be prevented from infiltrating into the boundary reaction layer 13 still more reliably. Moreover, a contribution of a $ZnTiO_3$ crystalline phase generated by a reaction of ZnO and $TiO_2$ to adhesion between the first dielectric layer 11 and the second dielectric layer 12 is considered. Therefore, the laminated first dielectric layer 11 and second dielectric layer 12 can be prevented from peeling still more reliably by including ZnO in both of the first dielectric layer 11 and the second dielectric layer 12.

When the ceramic electronic component 10 is manufactured by including ZnO in both of the first dielectric layer 11 and the second dielectric layer 12, the first base material and the second base material containing Ba, Nd, and Ti are simultaneously calcined by including ZnO as the first additive and the second additive respectively. The second base material contains Ti and the first additive and the second additive contain Zn. By simultaneously calcining Ti contained in the first dielectric layer 11 and Zn contained in the first additive and the second additive to cause a reaction, the first dielectric layer 11 and the second dielectric layer 12 are formed, the boundary reaction layer 13 containing ZnO and $TiO_2$ is formed between the first dielectric layer 11 and the second dielectric layer 12 and also ZnO is contained in both the first dielectric layer 11 and the second dielectric layer 12.

When the first base material and the first additive are calcined to produce calcination powders, the calcining temperature is preferably 800° C. or more and 950° C. or less, more preferably 800° C. or more and 900° C. or less, and most preferably 830° C. or more and 870° C. or less. The calcining time is not specifically limited, but is preferably two hours or more and five hours or less.

When the second base material and the second additive are calcined to produce calcination powders, like the above case, the calcining temperature is preferably 800° C. or more and 950° C. or less, more preferably 800° C. or more and 900° C. or less, and most preferably 830° C. or more and 870° C. or less. The calcining time is not specifically limited, but is preferably two hours or more and five hours or less.

When the intermediate material is calcined to produce calcination powders, like the above cases, the calcining temperature is preferably 800° C. or more and 950° C. or less, more preferably 800° C. or more and 900° C. or less, and most preferably 830° C. or more and 870° C. or less. The calcining time is not specifically limited, but is preferably two hours or more and five hours or less.

After the first base material and the first additive being calcined, a pulverization process is undergone for pulverization to a desired grain size to obtain a first finished material. After the second base material and the second additive being calcined, the pulverization process is undergone for pulverization to a desired grain size to obtain a second finished material. Paints are created, as described later, by adding each of the first finished material and the second finished material to a slurry and then, sheet bodies are created and each sheet body is alternately laminated to simultaneously calcine as a sheet laminated body. The optimum calcining temperature is a temperature preferable for the formation of the boundary reaction layer 13 and preferably, for example, 850° C. or more and 950° C. or less, more preferably 880° C. or more and 920° C. or less, and most preferably 900° C. or more and 920° C. or less. The calcining time is not specifically limited, but is preferably a half hour or more and two-and-half hours or less, particularly preferably around two hours.

Thus, according to the ceramic electronic component 10 in the present embodiment, with the boundary reaction layer 13 containing at least one of Zn, Ti, Cu, and Mg and the presence of the boundary reaction layer 13 between the first dielectric layer 11 and the second dielectric layer 12, the first dielectric layer 11 and the second dielectric layer 12 can be made to be laminated with stability while holding strong adhesive strength via the boundary reaction layer 13. Therefore, the ceramic electronic component 10 according to the present embodiment can prevent peeling between the laminated first dielectric layer 11 and second dielectric layer 12 from occurring even if dielectric layers of different materials like the first dielectric layer 11 and the second dielectric layer 12 are laminated and formed.

Method of Manufacturing Ceramic Electronic Components

Figure 2:
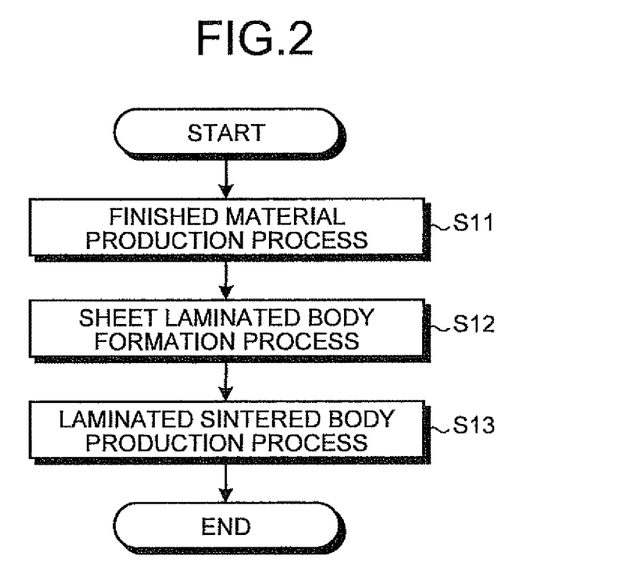
FIG. 2 is a flow chart showing a method of manufacturing ceramic electronic components according to the exemplary embodiment of the present invention.

Next, a suitable method of manufacturing ceramic electronic components having the above-described configuration will be described using drawings. FIG. 2 is a flow chart showing a method of manufacturing ceramic electronic components according to the exemplary embodiment of the present invention. As shown in FIG. 2, the method of manufacturing the ceramic electronic component 10 according to the present embodiment includes processes (a) to (c) shown below:

(a) A Finished Material Production Process (Step S11):

Mix a first base material containing Ba, Nd, and Ti and a first additive containing at least ZnO;

Calcine the mixture in an oxygen atmosphere at temperature of 800° C. or more and 950° C. or less to produce a first finished material;

Mix a second base material containing a different material from that of the first base material and a second additive containing at least ZnO; and Calcine the mixture in an oxygen atmosphere at temperature of 800° C. or more and 950° C. or less to produce a second finished material (b) A Sheet Laminated Body Formation Process (Step S12):

Alternately laminate a first sheet body (first green sheet) obtained by forming a first slurry containing the first finished material in a sheet shape and a second sheet body (second green sheet) obtained by forming a second slurry containing the second finished material in a sheet shape to form a sheet laminated body (c) A Laminated Sintered Body Production Process (Step S13):

Calcine the sheet laminated body to produce a laminated sintered body

Finished Material Production Process: Step S11

The finished material production process (step S11) is a process in which the first base material and the first additive are mixed and calcined to produce the first finished material and the second base material and the second additive are mixed and calcined to produce the second finished material.

The first base material contains Ba, Nd, and Ti. The first base material may further contain Mg, in addition to Ba, Nd, and Ti. The first additive contains at least one of ZnO, $B_2O_3$, $Bi_2O_3$, CoO, MnO, CuO, alkali-earth metal oxide, glass, and the like. In view of improving adhesive strength between the first dielectric layer 11 and the boundary reaction layer 13, the first additive preferably contains at least ZnO.

In the finished material production process (step S11), the first base material and the first additive are mixed to produce a first mixture. The first mixture is calcined in an oxygen atmosphere to obtain the first finished material. The calcining temperature for calcination is preferably 800° C. or more and 950° C. or less, more preferably 800° C. or more and 900° C. or less, and most preferably 830° C. or more and 870° C. or less. The calcining time is not specifically limited, but is preferably two hours or more and five hours or less. The first finished material is in a powder form and is pulverized by a wet ball mill or the like. Before the first base material being mixed with the first additive, the first base material may be pulverized into powder and calcined in order to efficiently mix with the first additive. In this case, the calcining temperature for calcination is preferably 1200° C. or more and 1300° C. or less, more preferably 1250° C. or more and 1270° C. or less, and most preferably around 1270° C. The calcining time is not specifically limited, but is preferably two hours or more and five hours or less.

The second base material contains, as described above, a different material from that of the first base material. Like the first additive, the second additive contains at least one of ZnO, $B_2O_3$, $Bi_2O_3$, CoO, MnO CuO, alkali-earth metal oxide, glass, and the like. In view of improving adhesive strength between the second dielectric layer 12 and the boundary reaction layer 13, like the first additive, the second additive preferably contains at least ZnO.

In the finished material production process (step S11), the second base material and the second additive are mixed to produce a second mixture. Like when the first mixture is produced, the second mixture is calcined in an oxygen atmosphere to obtain the second finished material. The calcining temperature for calcination is preferably 800° C. or more and 950° C. or less, more preferably 800° C. or more and 900° C. or less, and most preferably 830° C. or more and 870° C. or less. The calcining time is not specifically limited, but is preferably two hours or more and five hours or less. Like the first finished material, the second finished material is also in a powder form and is pulverized by a wet ball mill or the like. Like the first base material, before the second base material being mixed with the second additive, the second base material may be pulverized into powder and calcined in order to efficiently mix with the second additive.

After the first finished material and the second finished material being produced, the manufacturing method proceeds to the sheet laminated body formation process (step S12).

Sheet Laminated Body Formation Process: Step S12

The sheet laminated body formation process (step S12) is a process in which the first green sheet (first sheet body) obtained by forming the first slurry containing the first finished material in a sheet shape and the second green sheet (second sheet body) obtained by forming the second slurry containing the second finished material in a sheet shape are alternately laminated to form the sheet laminated body.

In the sheet laminated body formation process (step S12), a predetermined amount of polyvinyl alcohol, acryl, or ethylcellulose based organic binder is compounded into the first finished material and mixed to produce the first slurry containing the first finished material. The first slurry is used for sheet formation and applied onto a substrate at a plurality of locations in a sheet shape by the doctor blade method or the like. The first slurry applied to the substrate is dried to obtain a plurality of first green sheets. The formation method of first green sheet is not specifically limited as long as the first slurry can be applied in a sheet shape and may be a wet formation method such as a sheet method or a printing method or a dry formation method such as press molding.

Like the first finished material, the second slurry containing the second finished material is produced for the second finished material. Like the first slurry, the second slurry is also used for sheet formation. The second slurry is applied onto first sheet bodies formed on the substrate in a sheet shape. The second slurry is applied onto the first green sheets by the doctor blade method or the like and the second slurry applied onto the first green sheets is dried to form the plurality of second green sheets.

The sheet laminated body is formed on the substrate by alternately laminating the plurality of first green sheets and the plurality of second green sheets. After the sheet laminated body being produced, the sheet laminated body is removed from the substrate before proceeding to the laminated sintered body production process (step S13).

Laminated Sintered Body Production Process: Step S13

The laminated sintered body production process (step S13) is a process in which the sheet laminated body is calcined and cured to produce the laminated sintered body. In the laminated sintered body production process (step S13), the obtained sheet laminated body is cut into predetermined forms to form chip-type sheet laminated bodies and after the binder contained in the first green sheet and the second green sheet being removed, the sheet laminated bodies are calcined to produce laminated sintered bodies. It is preferable to carry out calcination in an oxygen atmosphere like the air. The optimum calcining temperature is a temperature preferable for the formation of the boundary reaction layer 13 and preferably, for example, 850° C. or more and 950° C. or less, more preferably 880° C. or more and 920° C. or less, and most preferably 900° C. or more and 920° C. or less.

The first green sheet becomes the first dielectric layer 11 through calcinations and the second green sheet becomes the second dielectric layer 12 through calcination. The first green sheet is a sheet formed into a sheet shape by using the first base material and thus, Ba, Nd, and Ti contained in the first base material are also contained in the first green sheet. By calcining the sheet laminated body, Ba, Nd, and Ti contained in the first green sheet become BaO, $Nd_2O_3$, and $TiO_2$ respectively and the first dielectric layer 11 contains BaO, $Nd_2O_3$, and $TiO_2$ as main components. Also by calcining the sheet laminated body, the boundary reaction layer 13 is formed between the first dielectric layer 11 and the second dielectric layer 12. The boundary reaction layer 13 contains at least one of Zn, Ti, Cu, and Mg and with the presence of the boundary reaction layer 13 between the first dielectric layer 11 and the second dielectric layer 12, the first dielectric layer 11 and the second dielectric layer 12 can be made to be laminated with stability while holding strong adhesive strength via the boundary reaction layer 13.

After an external electrode and an internal electrode being formed in the obtained laminated sintered body, the ceramic electronic component 10 can be obtained by plating the laminated sintered body to a predetermined thickness. Thus, the ceramic electronic component obtained by the method of manufacturing ceramic electronic components according to the present embodiment can prevent an occurrence of peeling between the first green sheet and the second green sheet and therefore, highly reliable ceramic electronic components can be manufactured.

Glass powder may be mixed with one of or both of the first green sheet and the second green sheet. Glass powder whose glass softening point is 450° C. or more and 650° C. or less is preferably used. Zn, Ti, Cu, and Mg contained as components to form the boundary reaction layer 13 promotes liquid phase sintering through glass whose glass softening point is low so as to promote the sintering of the boundary reaction layer 13 and thus, the boundary reaction layer 13 is formed with the fixed thickness. Also, the first dielectric layer 11 and the second dielectric layer 12 can be made to be laminated while holding strong adhesive strength via the boundary reaction layer 13. If the first dielectric layer and the second dielectric layer are simultaneously sintered, the Q factor of the ceramic electronic component can be improved by glass contained in one of or both of the first dielectric layer 11 and the second dielectric layer 12.

For printing of an internal electrode, the first green sheet and the second green sheet are alternately stacked a plurality of times while an Ag-base metal of a conductive material to be an internal electrode is arranged therebetween and the laminated product is cut into predetermined dimensions to form chip-type sheet laminated bodies. In this case, the optimum calcining temperature is a temperature preferable for the formation of the boundary reaction layer 13 and preferably, for example, 850° C. or more and 950° C. or less, more preferably 880° C. or more and 920° C. or less, and most preferably 900° C. or more and 920° C. or less. By forming an external electrode in the obtained laminated sintered body, a ceramic electronic component including an internal electrode composed of Ag-base metal can be produced. For the external electrode, an aid material such as a glass frit and an oxide is frequently contained in the electrode. Thus, the printing temperature that is lower than the temperature at which a chip is calcined is used for printing/calcination. For example, the temperature of 650° C. or more and 700° C. or less is used for printing.

Ceramic Electronic Component

Figure 3:
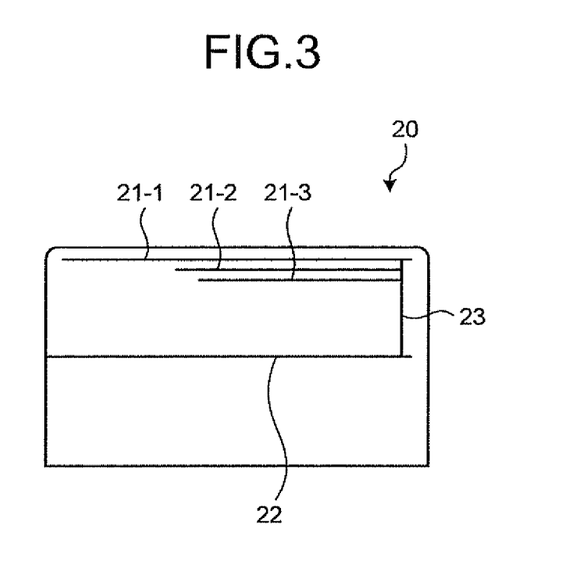
FIG. 3 is a conceptual diagram schematically showing an embodiment when the ceramic electronic component in the present embodiment is used as an LC filter.

A ceramic electronic component in the present embodiment can suitably be used, for example, as a ceramic electronic component of a multilayer device, which is a kind of high-frequency device. The multilayer device has a dielectric device such as a capacitor and an inductor integrally produced therein or manufactured by using a multilayer ceramic substrate composed of a plurality of ceramic layers integrally embedded therein. Such multilayer ceramic substrates are manufactured by using the method of manufacturing ceramic electronic components according to the present embodiment described above. The ceramic electronic component according to the present embodiment can also be suitably used, in addition to the multilayer device, for an LC filter. FIG. 3 is a conceptual diagram schematically showing an embodiment when a ceramic electronic component in the present embodiment is used as an LC filter. As shown in FIG. 3, an LC filter 20 includes capacitors 21-1 to 21-3 and a coil 22. The capacitors 21-1 to 21-3 are connected to the coil 22 by a via (via conductor) 23. The capacitor portion of the LC filter 20 has a three-layer structure, but a ceramic electronic component in the present embodiment is not limited to the three-layer structure and any multi-layer structure may be adopted. Thus, a ceramic electronic component in the present embodiment can suitably be used as a multilayer SMD for an LC filter.

A ceramic electronic component in the present embodiment can also be suitably used as a ceramic electronic component for a capacitor, a low-pass filter (LPF), a band-pass filter (BPF), a diplexer (DPX), a coupler (directional coupler), and a balun (balance-unbalance impedance converter).

The present invention will be described more specifically below using examples and comparative examples, but the present invention is not limited to the following examples.

A method of producing a base material containing components constituting each of the first dielectric layer and the second dielectric layer and a sheet body used to form the first dielectric layer and the second dielectric layer will be described. The base material to be used includes BaNdTiO based oxide, $2MgO.SiO_2$, and a mixture of BaNdTiO based oxide and $2MgO.SiO_2$. The sheet body includes a sheet body of BaNdTiO based oxide, that of $2MgO.SiO_2$, and that of the mixture of BaNdTiO based oxide and $2MgO.SiO_2$.

1-1. Production of BaNdTiO Based Oxide (BaO—Nd$_2$O$_3$—TiO$_2$)

Barium carbonate (BaCO$_3$) of 24.36% by mass, neodymium hydroxide (Nd(OH)$_3$) of 40.29% by mass, and titanium oxide (TiO$_2$) of 35.35% by mass are weighed. The sum of BaCO$_3$, Nd(OH)$_3$, and TiO$_2$ is adjusted to 100% by mass, the weighed powder is put into a nylon ball mill, and ion exchanged water and a commercial dispersing agent are added to produce a slurry in which the slurry concentration is 25% and the slurry is mixed for 16 hours.

The mixed slurry is recovered and dried at 120° C. for 24 hours and then, a dried mass is ground by a Wiley mill (trade name: WT-50, manufactured by Miki Seisakusho) to allow powder to pass by sieving with shaking using a #30 mesh. The recovered powder is packed into a small box case made of magnesia and calcined in an electric furnace in an atmosphere of the air at 1270° C. for two hours to obtain calcined powder (called "primary calcined powder") of base materials.

Boron oxide (B$_2$O$_3$) of 1.5% by mass, zinc oxide (ZnO) of 2.0% by mass, and copper oxide (CuO) of 1.0% by mass are weighed against the primary calcined powder of 100% by mass. The weighed powder is put into the nylon ball mill and ion exchanged water is added to produce a slurry in which the slurry concentration is 33% and the slurry is mixed for 16 hours.

The mixed slurry is recovered and dried at 120° C. for 24 hours and then, a dried mass is ground by the Wiley mill to allow powder to pass by sieving with shaking using a #300 mesh. The recovered powder is packed into the small box case made of magnesia and calcined in the electric furnace in an atmosphere of the air at 850° C. for two hours to obtain calcined powder (called "secondary calcined powder") of a mixture of base materials and additives.

The obtained secondary calcined powder is weighed at 99% by mass and Ag powder at 1% by mass, the powder thereof is put into the nylon ball mill and alcohol is added to produce a slurry in which the slurry concentration is 33% and the slurry is mixed for 16 hours to obtain a pulverized finished material.

The mixed alcohol slurry is recovered and dried at 80° C. to 120° C. for 24 hours and then, a dried mass is ground by the Wiley mill to allow powder to pass by sieving with shaking using the #300 mesh to obtain the finished material.

1-2. Production of Sheet Bodies of BaNdTiO Based Oxide (BaO—Nd$_2$O$_3$—TiO$_2$)

Predetermined amounts of commercial toluene (primary), alcohol (superfine), a dispersing agent, an acrylic resin lacquer, and commercial n-butyl-phthalyl n-butyl-glycolate as a plasticizer are added to the finished material obtained according to the above method, the finished material and additives are put into a polyethylene ball mill and mixed for 16 hours to obtain a slurry for sheet body formation. The slurry is applied onto a substrate by the doctor blade method to produce a plurality of sheet bodies.

2-1. Production of 2MgO.SiO$_2$

Boron oxide (B$_2$O$_3$) of 8.0% by mass, zinc oxide (ZnO) of 12.0% by mass, copper oxide (CuO) of 4.0% by mass, and calcium carbonate (CaCO$_3$) of 1.0% by mass are weighed against forsterite (2MgO.SiO$_2$) of 100% by mass. The weighed powder is put into the nylon ball mill and ion exchanged water is added to produce a slurry in which the slurry concentration is 33% and the slurry is mixed for 16 hours.

The mixed slurry is recovered and dried at 120° C. for 24 hours and then, a dried mass is ground by the Wiley mill to allow powder to pass by sieving with shaking using the #300 mesh. The recovered powder is packed into the small box case made of magnesia and calcined in the electric furnace in an atmosphere of the air at 850° C. for two hours to obtain calcined powder of a mixture of base materials and additives.

The obtained calcined powder is weighed at 100% by mass and lithium based glass (LS-5 manufactured by Asahi Glass) at 3% by mass, the calcined powder is put into the nylon ball mill and alcohol is added to produce a slurry in which the slurry concentration is 33% and the slurry is mixed for 16 hours to obtain a pulverized finished material.

The slurry containing the finished material is recovered and dried at 80° C. to 120° C. for 24 hours and then, a dried mass is ground by the Wiley mill to allow powder to pass by sieving with shaking using the #300 mesh to obtain the finished material.

2-2. Production of Sheet Bodies of 2MgO.SiO$_2$

Predetermined amounts of commercial toluene (primary), alcohol (superfine), a dispersing agent, an acrylic resin lacquer, and commercial n-butyl-phthalyl n-butyl-glycolate as a plasticizer are added to the finished material obtained according to the above method, the finished material and additives are put into the polyethylene ball mill and mixed for 16 hours to obtain a slurry for sheet body formation. The slurry is applied onto a substrate by the doctor blade method to produce a plurality of sheet bodies.

3-1. Production of Composite Material of BaNdTiO Based Oxide and 2MgO.SiO$_2$

Barium carbonate (BaCO$_3$) of 24.36% by mass, neodymium hydroxide (Nd(OH)$_3$) of 40.29% by mass, and titanium oxide (TiO$_2$) of 35.35% by mass are weighed and the sum of BaCO$_3$, Nd(OH)$_3$, and TiO$_2$ is adjusted to 100% by mass. The weighed powder is put into the nylon ball mill and ion exchanged water and a commercial dispersing agent are added to produce a slurry in which the slurry concentration is 25% and the slurry is mixed for 16 hours.

The mixed slurry is recovered and dried at 120° C. for 24 hours and then, a dried mass is ground by the Wiley mill to allow powder to pass by sieving with shaking using the #30 mesh. The recovered powder is packed into the small box case made of magnesia and calcined in the electric furnace in an atmosphere of the air at 1270° C. for two hours to obtain calcined powder (called "primary calcined powder") of base materials.

Forsterite (2MgO.SiO$_2$) of 31.5% by mass is weighed against the primary calcined powder of 68.5% by mass to adjust the sum of the primary calcined powder and forsterite to 100% by mass. B$_2$O$_3$ of 2.48% by mass, ZnO of 6.67% by mass, Bi$_2$O$_3$ of 3.14% by mass, CoO of 1.12% by mass, MnCO$_3$ of 0.66% by mass, and CaCO$_3$ of 1.07% by mass are weighed, the weighed powder is put into the nylon ball mill and ion exchanged water is added to produce a slurry in which the slurry concentration is 33% and the slurry is mixed for 16 hours.

The mixed slurry is recovered and dried at 120° C. for 24 hours and then, a dried mass is ground by the Wiley mill to allow powder to pass through a sieve of the #300 mesh. The recovered powder is packed into the small box case made of magnesia and calcined in the electric furnace in an atmosphere of the air at 850° C. for two hours to obtain calcined powder (called "secondary calcined powder") of a mixture of base materials and additives.

The obtained secondary calcined powder is weighed at 100% by mass and Ag powder at 0.75% by mass, the powder thereof is put into the nylon ball mill and alcohol is added to produce a slurry in which the slurry concentration is 33% and the slurry is mixed for 16 hours to obtain a pulverized finished material.

The mixed alcohol slurry is recovered and dried at 80° C. to 120° C. for 24 hours and then, a dried mass is ground by the Wiley mill to allow powder to pass by sieving with shaking using the #300 mesh to obtain the finished material.

3-2. Production of Sheet Bodies of Composite Material of BaNdTiO Based Oxide and 2MgO.SiO$_2$ Predetermined amounts of commercial toluene (primary), alcohol (superfine), a dispersing agent, an acrylic resin lacquer, and commercial n-butyl-phthalyl n-butyl-glycolate as a plasticizer are added to the finished material obtained according to the above method, the finished material and additives are put into the polyethylene ball mill and mixed for 16 hours to obtain a slurry for sheet body formation. The slurry is applied onto a substrate by the doctor blade method to produce a plurality of sheet bodies.

Examples 1 to 11 and Comparative Examples 1 to 10

BaNdTiO based oxide, 2MgO.SiO$_2$, and a composite material of BaNdTiO based oxide and 2MgO.SiO$_2$ obtained as described above are used as base materials to form a first dielectric layer and a second dielectric layer. One or more of ZnO, B$_2$O$_3$, CoO, MnO, Bi$_2$O$_3$, CaCO$_3$, Ag, Cup, Li based glass, Na based glass, Bi based glass, Ba based glass, and Mg based glass are used as an additive. By using these base materials and additives, laminated sintered bodies (chips) formed in a chip shape are produced under conditions shown in Tables 1-1, 1-2, 2-1 and 2-2. These main components of a boundary reaction layer, whether a plating solution has infiltrated into the boundary reaction layer, the rate of pores of the boundary reaction layer, the thickness of the boundary reaction layer, the softening point of glass, and peeling conditions of the first dielectric layer and the second dielectric layer are verified. These measurement results are shown in Tables 1-1, 1-2, 2-1 and 2-2. The method of producing a chip and the evaluation method thereof are the same as those shown in Example 7 below except that conditions shown in Tables 1-1, 1-2, 2-1 and 2-2 are changed.

TABLE 1-1

|  | 1st dielectric layer | | 2nd dielectric layer | |
|---|---|---|---|---|
|  | 1st main component | 1st sub component | 2nd main component | 2nd sub component |
| Ex. 1 | BaNdTiO base oxide + 2MgO•SiO$_2$ | ZnO, B$_2$O$_3$, CoO, MnO, Bi$_2$O$_3$, CaCO$_3$, Ag, CuO | 2MgO•SiO$_2$ | ZnO, CuO, B$_2$O$_3$, Na base glass |
| Ex. 2 | BaNdTiO base oxide + 2MgO•SiO$_2$ | ZnO, B$_2$O$_3$, CoO, MnO, Bi$_2$O$_3$, CaCO$_3$, Ag | 2MgO•SiO$_2$ | ZnO, CuO, B$_2$O$_3$, Na base glass |
| Ex. 3 | BaNdTiO base oxide + 2MgO•SiO$_2$ | ZnO, B$_2$O$_3$, CoO, MnO, Bi$_2$O$_3$, CaCO$_3$, Ag, Li base glass | 2MgO•SiO$_2$ | ZnO, CuO, B$_2$O$_3$, Na base glass |
| Ex. 4 | BaNdTiO base oxide + 2MgO•SiO$_2$ | ZnO, B$_2$O$_3$, CoO, MnO, Bi$_2$O$_3$, CaCO$_3$, Ag, CuO | 2MgO•SiO$_2$ | ZnO, CuO, B$_2$O$_3$, Li base glass |
| Ex. 5 | BaNdTiO base oxide + 2MgO•SiO$_2$ | ZnO, B$_2$O$_3$, CoO, MnO, Bi$_2$O$_3$, CaCO$_3$, Ag | 2MgO•SiO$_2$ | ZnO, CuO, B$_2$O$_3$, Li base glass |
| Ex. 6 | BaNdTiO base oxide + 2MgO•SiO$_2$ | ZnO, B$_2$O$_3$, CoO, MnO, Bi$_2$O$_3$, CaCO$_3$, Ag, Li base glass | 2MgO•SiO$_2$ | ZnO, CuO, B$_2$O$_3$, Li base glass |
| Ex. 7 | BaNdTiO base oxide | ZnO, CuO, B$_2$O$_3$, Ag | 2MgO•SiO$_2$ | ZnO, CuO, B$_2$O$_3$, CaCO$_3$, Li base glass |
| Ex. 8 | BaNdTiO base oxide | ZnO, CuO, B$_2$O$_3$, Ag | 2MgO•SiO$_2$ | ZnO, CuO, B$_2$O$_3$, CaCO$_3$, Bi base glass |
| Ex. 9 | BaNdTiO base oxide | ZnO, CuO, B$_2$O$_3$, Ag | 2MgO•SiO$_2$ | ZnO, CuO, B$_2$O$_3$, CaCO$_3$, Ba base glass |
| Ex. 10 | BaNdTiO base oxide | ZnO, CuO, B$_2$O$_3$, Ag | 2MgO•SiO$_2$ | ZnO, CuO, B$_2$O$_3$, CaCO$_3$, Mg base glass |
| Ex. 11 | BaNdTiO base oxide + 2MgO•SiO$_2$ | ZnO, B$_2$O$_3$, CoO, MnO, Bi$_2$O$_3$, CaCO$_3$, Ag, Li base glass | 2MgO•SiO$_2$ | ZnO, B$_2$O$_3$, CaCO$_3$, TiO$_2$, Li base glass |

TABLE 1-2

|  | Primary calcining temperature [C.°] | Main components of boundary reaction layer | Thickness of boundary reaction layer [μm] | Infiltration | Rate of pores | Softening point of glass [C.°] | Peeling |
|---|---|---|---|---|---|---|---|
| Ex. 1 | 850 | MgO, CuO, ZnO, TiO$_2$, | 10 | None | No problem | 500 | No |
| Ex. 2 | 850 | MgO, CuO, ZnO, TiO$_2$, | 10 | None | No problem | 500 | No |
| Ex. 3 | 850 | MgO, CuO, ZnO, TiO$_2$, | 10 | None | No problem | 500 | No |
| Ex. 4 | 850 | MgO, CuO, ZnO, TiO$_2$, | 10 | None | No problem | 550 | No |
| Ex. 5 | 850 | MgO, CuO, ZnO, TiO$_2$, | 10 | None | No problem | 550 | No |
| Ex. 6 | 850 | MgO, CuO, ZnO, TiO$_2$, | 10 | None | No problem | 550 | No |
| Ex. 7 | 850 | MgO, CuO, ZnO, TiO$_2$, | 10 | None | No problem | 550 | No |
| Ex. 8 | 850 | MgO, CuO, ZnO, TiO$_2$, | 10 | None | No problem | 450 | No |

TABLE 1-2-continued

| | Primary calcining temperature [C.°] | Main components of boundary reaction layer | Thickness of boundary reaction layer [μm] | Infiltration | Rate of pores | Softening point of glass [C.°] | Peeling |
|---|---|---|---|---|---|---|---|
| Ex. 9 | 850 | MgO, CuO, ZnO, TiO$_2$, | 10 | None | No problem | 600 | No |
| Ex. 10 | 850 | MgO, CuO, ZnO, TiO$_2$, | 10 | None | No problem | 650 | No |
| Ex. 11 | 850 | MgO, ZnO, TiO$_2$, | 10 | None | No problem | 550 | No |

TABLE 2-1

| | 1st dielectric layer | | 2nd dielectric layer | |
|---|---|---|---|---|
| | 1st main component | 1st sub component | 2nd main component | 2nd sub component |
| Cmp. 1 | BaNdTiO base oxide | CuO, B$_2$O$_3$, Ag | BaNdTiO base oxide + Mg$_2$SiO$_4$ | ZnO, B$_2$O$_3$, CoO, MnO, Bi$_2$O$_3$, CaCO$_3$, Ag |
| Cmp. 2 | BaNdTiO base oxide | CuO, B$_2$O$_3$, Ag | BaNdTiO base oxide + Mg$_2$SiO$_4$ | B$_2$O$_3$, CoO, MnO, Bi$_2$O$_3$, CaCO$_3$, Ag |
| Cmp. 3 | BaNdTiO base oxide + Mg$_2$SiO$_4$ | ZnO, B$_2$O$_3$, CoO, MnO, Bi$_2$O$_3$, CaCO$_3$, Ag | 2MgO•SiO$_2$ | CuO, B$_2$O$_3$, Na base glass |
| Cmp. 4 | BaNdTiO base oxide + Mg$_2$SiO$_4$ | B$_2$O$_3$, CoO, MnO, Bi$_2$O$_3$, CaCO$_3$, Ag | 2MgO•SiO$_2$ | CuO, B$_2$O$_3$, Na base glass |
| Cmp. 5 | BaNdTiO base oxide | ZnO, CuO, B$_2$O$_3$, Ag | 2MgO•SiO$_2$ | CuO, B$_2$O$_3$, CaCO$_3$, Li base glass |
| Cmp. 6 | BaNdTiO base oxide | CuO, B$_2$O$_3$, Ag | 2MgO•SiO$_2$ | CuO, B$_2$O$_3$, CaCO$_3$, Li base glass |
| Cmp. 7 | BaNdTiO base oxide | ZnO, CuO, B$_2$O$_3$, Ag | 2MgO•SiO$_2$ | ZnO, CuO, B$_2$O$_3$, CaCO$_3$, Li base glass |
| Cmp. 8 | BaNdTiO base oxide | ZnO, CuO, B$_2$O$_3$, Ag | 2MgO•SiO$_2$ | ZnO, CuO, B$_2$O$_3$, CaCO$_3$, Bi—B base glass |
| Cmp. 9 | BaNdTiO base oxide | ZnO, CuO, B$_2$O$_3$, Ag | 2MgO•SiO$_2$ | ZnO, CuO, B$_2$O$_3$, CaCO$_3$, Si—Al base glass |

TABLE 2-2

| | Primary calcining temperature [C.°] | Main components of boundary reaction layer | Thickness of boundary reaction layer [μm] | Infiltration | Rate of pores | Softening point of glass [C.°] | Peeling |
|---|---|---|---|---|---|---|---|
| Cmp. 1 | 850 | No formation | — | Yes | 50% | No glass | Yes |
| Cmp. 2 | 850 | No formation | — | Yes | 50% | No glass | Yes |
| Cmp. 3 | 850 | No formation | — | Yes | 50% | 500 | Yes |
| Cmp. 4 | 850 | No formation | — | Yes | 50% | 500 | Yes |
| Cmp. 5 | 850 | No formation | — | Yes | 50% | 550 | Yes |
| Cmp. 6 | 850 | No formation | — | Yes | 50% | 550 | Yes |
| Cmp. 7 | 700 | No formation | — | Yes | 50% | 550 | Yes |
| Cmp. 8 | 850 | No formation | — | Yes | 50% | 400 | Yes |
| Cmp. 9 | 850 | No formation | — | Yes | 50% | 700 | Yes |

Example 7

Chip Manufacture Using a Composite Material of BaNdTio based oxide and 2MgO.SiO$_2$ Before Calcination Ag paste (manufactured by TDK) is printed on a BaO—NdO$_3$—TiO$_2$ ceramic sheet in a predetermined capacitor pattern shape (pattern in which the shape of chip after calcination is 4.5 mm in the longitudinal direction and 3.2 mm in the width direction) and the ceramic sheet is dried at 120° C. for 15 min.

Next, a 2MgO.SiO$_2$ ceramic sheet as an external layer and the printed BaO—NdO$_3$—TiO$_2$ ceramic sheet as an internal layer are laminated (the internal layer has a four-layer structure) and pressed under conditions of 70° C., 700 kg/cm$^2$, and seven min. Then, the laminated body is cut into predetermined capacitor forms by a wet cutting process, unbound at 350° C. for one hour using a batch furnace and then, calcined in an oxygen atmosphere at 950° C. for 2.5 hours to obtain chips.

After Calcination

To form an external terminal at an edge of the calcined chip, commercial external terminal paste of Ag is manually applied to both sides of the terminal and dried at 120° C. for 15 min before being calcined by a continuous kiln (manufactured by LINDBERG) at 670° C. The chip whose edge is calcined is plated with Cu—Ni—Sn using an electroplating system to a predetermined film thickness by each plating.

Verification Method of the Thickness of the Boundary Reaction Layer of a Chip

Figure 4:
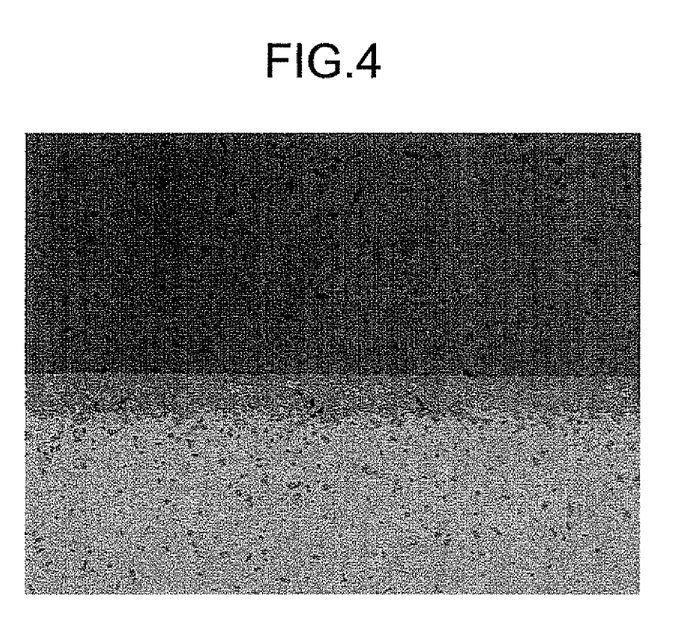
FIG. 4 is a diagram showing a COMPO image near a boundary of a chip in Example 7.

A plated chip is broken by cutting pliers, a broken boundary surface is observed through a scanning electron microscope (trade name: JSM-T300, manufactured by JEOL), and a 2000×COMPO image of the boundary surface after the calcination is taken to verify the thickness of the boundary reaction layer. FIG. 4 is a diagram showing a COMPO image near a boundary of the chip in Example 7. As shown in FIG. 4, it is verified that the second dielectric layer ($2MgO.SiO_2$) is formed as an upper layer and the first dielectric layer (BaNd-TiO based oxide) as a lower layer. The formation of a boundary reaction layer (thickness: 10 μm) between the upper layer and the lower layer is confirmed. That is, it is verified that the boundary reaction layer is formed between the upper layer and the lower layer by a reaction after the simultaneous calcination.

Verification Method of Diffusion Elements on the Boundary Surface of a Chip

Figure 5:
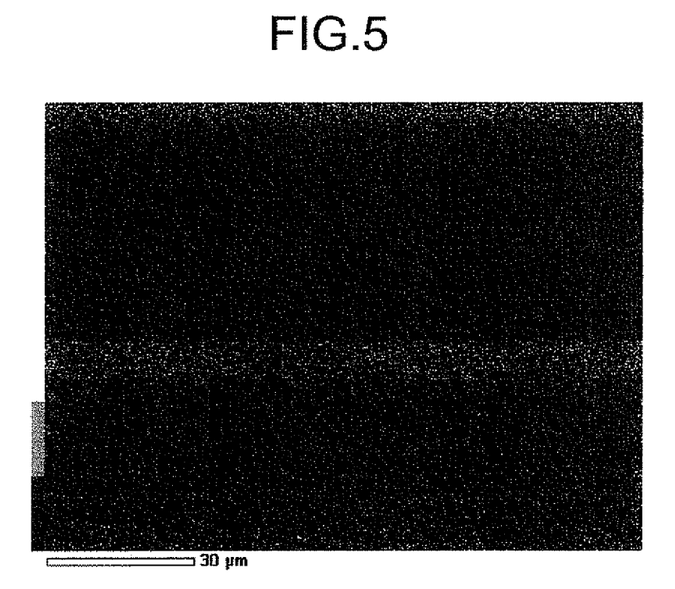
FIG. 5 is a diagram showing an EDS image of a Zn component of the chip in Example 7.
Figure 6:
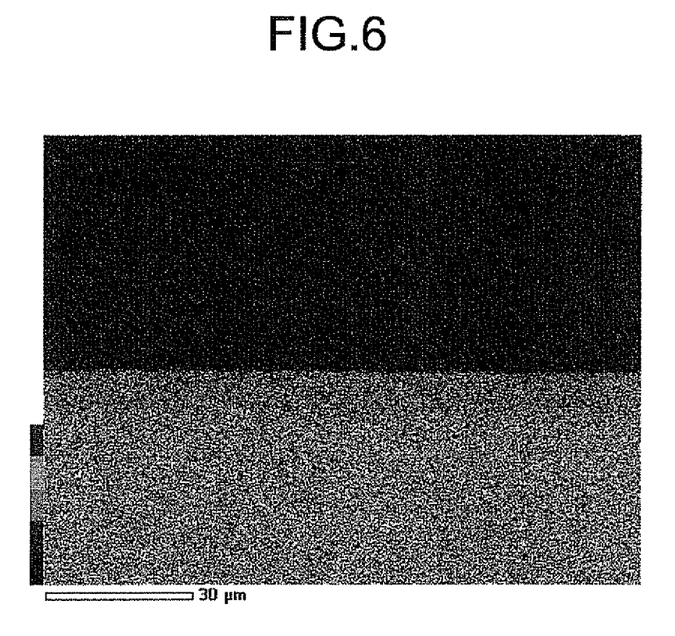
FIG. 6 is a diagram showing the EDS image of a Ti component of the chip in Example 7.
Figure 7:
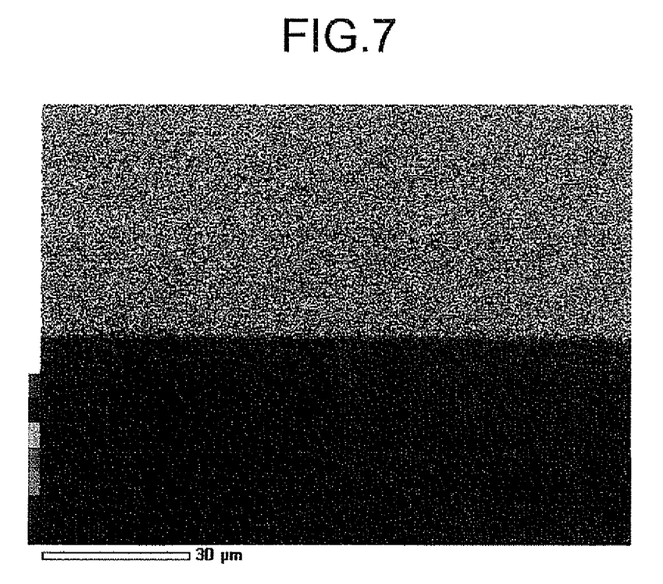
FIG. 7 is a diagram showing the EDS image of an Mg component of the chip in Example 7.
Figure 8:
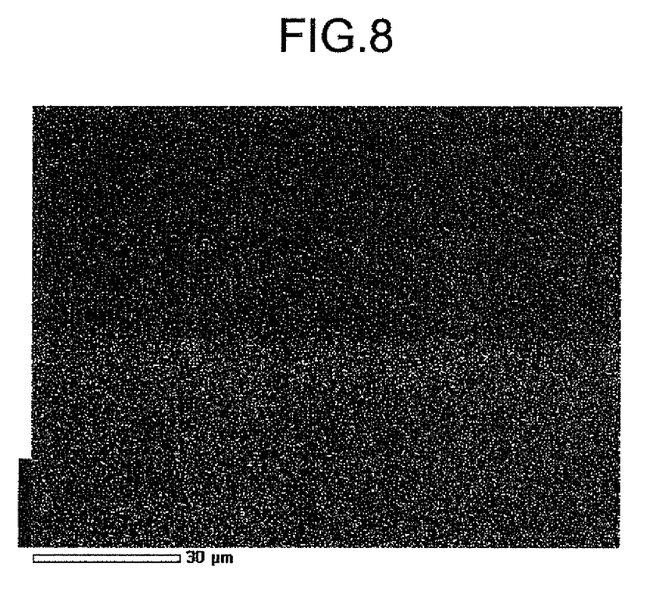
FIG. 8 is a diagram showing the EDS image of a Cu component of the chip in Example 7.

A chip after being calcined is embedded in a container using commercial epoxy resin and polished by using a polishing agent and after being finished as mirror surface polishing, an SEM-EDS observation of the polished surface is made through a scanning electron microscope (trade name: JSM-6700, manufactured by JEOL), and an EDS image (2000×) of the boundary surface after the calcination is taken to verify the state of diffusion element distribution on the boundary surface. FIG. 5 is a diagram showing an EDS image of a Zn component of the chip in Example 7. FIG. 6 is a diagram showing the EDS image of a Ti component of the chip in Example 7. FIG. 7 is a diagram showing the EDS image of an Mg component of the chip in Example 7. FIG. 8 is a diagram showing the EDS image of a Cu component of the chip in Example 7.

Verification Method of Whether a Plating Solution on the Boundary Surface of a Chip has Infiltrated into the Boundary Reaction Layer A plated chip is broken by cutting pliers, a broken boundary surface is observed through the scanning electron microscope (trade name: JSM-T300, manufactured by JEOL), and a COMPO image (2000×) of the boundary surface after the calcination is taken to verify whether a plating solution has infiltrated into the boundary surface.

Verification Method of Peeling Conditions on the Boundary Surface of a Chip

Three surfaces (plane, flank, and end face) of a plated chip are verified through a metallurgical microscope to check ten locations of each sample for any failure such as peeling.

From Tables 1-1, 1-2, 2-1 and 2-2, it is verified that main components of the boundary reaction layer in Examples 1 to 10 are all ZnO, $TiO_2$, CuO, and MgO. Neither peeling when integrated with the first dielectric layer and the second dielectric layer nor infiltration of the plating solution into interfaces of the boundary reaction layer after plating with the first dielectric layer and the second dielectric layer is confirmed. On the other hand, the formation of a boundary reaction layer is not confirmed in any of Comparative Examples 1 to 9. Moreover, peeling when calcined together with the first dielectric layer and the second dielectric layer is confirmed and also infiltration of the plating solution into interfaces of the boundary reaction layer after plating with the first dielectric layer and the second dielectric layer is confirmed. Therefore, it is verified that in a ceramic electronic component in the present embodiment, the first dielectric layer and the second dielectric layer are laminated with stability via the boundary reaction layer without peeling of the laminated dielectric layers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ceramic electronic component, comprising:
    a first dielectric layer mainly containing BaO, $Nd_2O_3$, and $TiO_2$;
    a second dielectric layer containing a main component of any one of forsterite, enstatite, and diopside; and
    a boundary reaction layer having a $ZnTiO_3$ crystalline structure formed between the first dielectric layer and the second dielectric layer
    by calcining the first dielectric layer and the second dielectric layer at a temperature of 800° C. or more and 950° C. or less.

2. The ceramic electronic component according to claim 1, wherein ZnO is contained in both the first dielectric layer and the second dielectric layer.

3. The ceramic electronic component according to claim 1, wherein at least Si is contained in at least one of the first dielectric layer and the second dielectric layer.

4. A method of manufacturing the ceramic electronic component of claim 1, comprising:
    mixing a first base material containing Ba, Nd, and Ti and a first additive containing at least ZnO to a first mixture;
    calcining the first mixture in oxygen atmosphere at a temperature of 800° C. or more and 950° C. or less to produce a first finished material;
    mixing a second base material containing a material different from the first base material and a second additive containing at least ZnO to produce a second mixture;
    calcining the second mixture in oxygen atmosphere at a temperature of 800° C. or more and 950° C. or less to produce a second finished material;
    alternately laminating a first sheet body and a second sheet body to form a sheet laminated body, the first sheet body being obtained by forming a first slurry containing the first finished material in a sheet shape, and the second sheet body being obtained by forming a second slurry containing the second finished material in a sheet shape; and
    calcining the sheet laminated body to produce a laminated sintered body.

5. The method of manufacturing a ceramic electronic component according to claim 4, wherein glass powder whose glass softening point is 450° C. or more and 650° C. or less is mixed in at least one of the first sheet body and the second sheet body.

6. A ceramic electronic component, comprising a sintered sheet laminated body, wherein:
    the sintered sheet laminated body is obtained by sintering a sheet laminated body in which a first sheet body and a second sheet body are alternately laminated,
    the first sheet body being obtained by forming a first slurry containing a first finished material in a sheet shape,
    the second sheet body being obtained by forming a second slurry containing a second finished material in a sheet shape,
    the first finished material being obtained by mixing a first base material containing Ba, Nd, and Ti and a first additive containing at least ZnO to produce a first mixture and by calcining the first mixture in oxygen atmosphere at a temperature of 800° C. or more and 950° C. or less,
    the second finished material being obtained by mixing a second base material containing a material different from the first base material and a second additive containing at least ZnO to produce a second mixture and by calcining the second mixture in oxygen atmosphere at a temperature of 800° C. or more and 950° C. or less, glass powder whose glass softening point is 450° C. or more and 650° C. or less being contained in at least one of the first sheet body and the second sheet body, a boundary reaction layer having a $ZnTiO_3$ crystalline structure is formed between a first dielectric layer as the first sheet body mainly containing BaO, $Nd_2O_3$, and $TiO_2$ and a second dielectric layer as the second sheet body containing the material different from the first dielectric layer, wherein the boundary reaction layer is formed by calcining the first dielectric layer and the second dielectric layer at a temperature of 800° C. or more and 950° C. or less.

* * * * *